US012352253B2

(12) United States Patent
Goellner et al.

(10) Patent No.: US 12,352,253 B2
(45) Date of Patent: Jul. 8, 2025

(54) SERVO SYSTEM BOLTED ON DESIGN

(71) Applicant: Danfoss Power Solutions Gmbh & Co. OHG, Neumünster (DE)

(72) Inventors: Wilhelm Goellner, Neumünster (DE); Andrej Babusa, Dolny Lieskov (SK); Heiko Laffrenzen, Ostenfeld (DE)

(73) Assignee: DANFOSS POWER SOLUTIONS GMBH & CO. OHG, Neumünster (DE)

(*) Notice: Subject to any disclaimer, the term of this patent is extended or adjusted under 35 U.S.C. 154(b) by 54 days.

(21) Appl. No.: 18/041,425

(22) PCT Filed: Jul. 30, 2021

(86) PCT No.: PCT/EP2021/071438
§ 371 (c)(1),
(2) Date: Feb. 13, 2023

(87) PCT Pub. No.: WO2022/033899
PCT Pub. Date: Feb. 17, 2022

(65) Prior Publication Data

US 2023/0304468 A1 Sep. 28, 2023

(30) Foreign Application Priority Data

Aug. 14, 2020 (DE) ..................... 10 2020 210 397.6

(51) Int. Cl.
*F04B 1/295* (2020.01)
*F03C 1/40* (2006.01)
(Continued)

(52) U.S. Cl.
CPC ............ *F04B 1/295* (2013.01); *F03C 1/0686* (2013.01); *F04B 1/324* (2013.01); *F04B 49/002* (2013.01)

(58) Field of Classification Search
CPC ........ F04B 1/295; F04B 1/324; F04B 49/002; F03C 1/0686
See application file for complete search history.

(56) References Cited

U.S. PATENT DOCUMENTS 3,521,450 A 7/1970 Martin
3,700,356 A * 10/1972 Kubik .................. F04B 49/002 91/506

(Continued)

FOREIGN PATENT DOCUMENTS

CN 106640575 B * 11/2018
DE 102005037619 A1 * 2/2007 ........... F04B 49/002

(Continued)

OTHER PUBLICATIONS

German Office Action issued on Apr. 7, 2021, in connection with corresponding German Application No. 10 2020 210 397.6 (21 pp., including machine-generated English translation).

(Continued)

*Primary Examiner* — Alexander B Comley
(74) *Attorney, Agent, or Firm* — McCormick, Paulding & Huber PLLC

(57) ABSTRACT

A hydrostatic servo assembly unit (1) for being arranged inside, outside or distant from a variable displacement hydrostatic unit (100) and for controlling the displacement of the variable displacement hydrostatic unit (100). The servo assembly unit (1) includes a servo housing (10) in which at least one servo piston (40) is arranged. The piston head (42) of the servo piston (40) can be pressurized such that the servo piston (40) can move linear relative to a servo cylinder (12) formed in the servo housing (10). The servo assembly unit (100) further includes a movable output element (49) protruding outside of the servo housing (10),
(Continued)

which can be mechanically coupled to a displacement element (102) of a variable displacement hydrostatic unit (100).

14 Claims, 7 Drawing Sheets

(51) Int. Cl.
*F04B 1/324* (2020.01)
*F04B 49/00* (2006.01)

(56) References Cited

U.S. PATENT DOCUMENTS

| | | | | |
|---|---|---|---|---|
| 4,040,255 | A * | 8/1977 | Hara | F16H 61/439 60/462 |
| 4,531,367 | A * | 7/1985 | Backe | F16H 61/465 60/447 |
| 5,184,466 | A * | 2/1993 | Schniederjan | F16H 61/431 60/449 |
| 5,226,349 | A * | 7/1993 | Alme | F04B 1/324 91/506 |
| 5,273,403 | A | 12/1993 | Im et al. | |
| 9,127,439 | B2 * | 9/2015 | Ooi | F02D 31/007 |
| 9,803,660 | B1 * | 10/2017 | Hansell | F04B 1/324 |
| 10,294,633 | B2 * | 5/2019 | Kondo | F15B 11/0406 |
| 10,830,348 | B2 * | 11/2020 | Marsch | F04B 1/34 |
| 10,890,252 | B2 * | 1/2021 | Matsuura | F16H 61/431 |
| 2008/0078456 | A1 * | 4/2008 | Thoms | E02F 9/226 137/488 |
| 2009/0133396 | A1 * | 5/2009 | Wustefeld | F04B 49/002 60/452 |
| 2010/0158706 | A1 | 6/2010 | Gruel | |
| 2010/0300084 | A1 * | 12/2010 | Sturmer | F04B 49/002 60/406 |
| 2014/0033696 | A1 * | 2/2014 | Thoms | F04B 49/22 60/413 |
| 2015/0226190 | A1 * | 8/2015 | Sakai | F04B 9/10 417/218 |
| 2015/0285214 | A1 * | 10/2015 | Thoms | F16H 61/42 91/422 |
| 2016/0341223 | A1 * | 11/2016 | Marsch | F16H 61/423 |
| 2017/0307075 | A1 * | 10/2017 | Matsuura | F04B 1/00 |
| 2019/0390767 | A1 * | 12/2019 | Matsuura | F04B 1/146 |
| 2020/0003191 | A1 * | 1/2020 | Ono | F04B 1/2078 |
| 2020/0011308 | A1 * | 1/2020 | Inada | F16H 61/42 |

FOREIGN PATENT DOCUMENTS

| | | | | |
|---|---|---|---|---|
| DE | 102009006880 | B3 * | 3/2010 | F01B 3/102 |
| DE | 10 2012 213 585 | A1 | 2/2014 | |
| DE | 10 2014 218 420 | A1 | 3/2016 | |
| DE | 11 2018 003 195 | | 3/2020 | |
| DE | 102019211466 | B3 * | 10/2020 | F04B 1/06 |
| EP | 3 102 824 | A1 | 12/2016 | |
| JP | 2005042724 | A * | 2/2005 | F01B 3/007 |

OTHER PUBLICATIONS

International Search Report mailed on Oct. 15, 2021, in connection with corresponding International Application No. PCT/EP2021/071438; 4 pages.

Notification of Transmittal of the International Preliminary Report on Patentability mailed on Nov. 16, 2022, in connection with corresponding International Application No. PCT/EP2021/071438; 56 pages.

* cited by examiner

SERVO SYSTEM BOLTED ON DESIGN

CROSS-REFERENCE TO RELATED APPLICATIONS

This application is a National Stage application of International Patent Application No. PCT/EP2021/071438, filed on Jul. 30, 2021, which claims priority to German Patent Application No. 10 2020 210 397.6, filed on Aug. 14, 2020, each of which is hereby incorporated by reference in its entirety.

TECHNICAL FIELD

The invention relates to a hydrostatic servo unit for e.g. adjusting the displacement volume of a variable displacement hydrostatic unit or for moving a steering mechanism, or moving flaps, or the like in a bi-directional linear movement. In addition, the invention is, for instance, related to hydrostatic units with a variable displacement arranged in an open or closed hydraulic circuit. Further, the present invention relates to working machines, in particular agricultural machines, excavators, telehandlers or other off- or on-road machines, which use servo units to perform bi-directional linear movements.

BACKGROUND

Hydrostatic servo units are frequently applied for adjusting the displacement volume of a variable displacement hydrostatic unit such as swashplate or bent axis pumps and motors, usable for hydraulic transmission devices, e.g. Although the hydrostatic servo units can be actuated and used in various ways and devices, e.g. using hydraulic pressure or electro-magnetic forces, it is of importance in most of the applications to provide a precise and reliable centering position for the appliance, especially, when the servo unit is used for controlling hydrostatic propel units, e.g., of work vehicles, or steering of flap devices. Often, springs are arranged on both sides of a servo piston of a servo unit and abut on one side against the servo piston head and on another side against the housing. This leads to an imprecise and difficult to adjust centering of the servo piston, as the centering force of the spring on one side is taken up by the spring on the other side, leading at least to a big hysteresis range. Therefore, in known servo units, the manufacturing and mounting tolerances of the two servo springs are summed up and the centering position can vary in a wide range.

Additionally, the servo units are often arranged in the housing of adjustable hydrostatic displacement units. In consequence, a design standardization which leads to lower production costs and a low effort assembly of the hydraulic displacement units are not possible, as for every displacement unit a specific version of servo unit is necessary. Further, the centering position of the servo units can usually only be adjusted before the servo unit is arranged in the casing of the displacement unit. In this configuration it is not possible to adjust the centering position of the servo spool after the variable displacement hydraulic unit is assembled to the neutral position of the variable displacement hydraulic unit, which in practice deviates from the theoretical position due to manufacturing and assembly tolerances.

Analogous to what is descript with hydrostatic units also applies to other apparatus controlled by servo units which are, therefore, also covered by the invention. As a preferred use of the servo unit according to the invention applies to variable displacement hydrostatic units, the invention is detailed merely exemplarily for hydrostatic units. A person with ordinary skills in the relevant art easily transfers the teaching to other devices or apparatuses which are using hydrostatic servo units, and are therefore covered by the inventive idea and within the scope of the present invention.

In many known applications, the servo unit comprises two pressure chambers on opposite sides of the servo spool/piston that can be pressurized when the servo piston is to be moved along its spool axis. If the movement of the servo piston shall be passed on to the outside of the housing, a piston rod protruding from one side of the servo spool through one of the pressure chambers to the outside of the housing of the servo unit is applied, e.g. This leads to an asymmetrical behavior of the servo piston, as no pressure can be applied to the part of the front surface of the servo spool, at which the piston rod is connected to.

Exemplarily, U.S. Pat. No. 3,521,450 discloses two servo units that are mechanically connected to tiltable swashplates of a pump and a motor of a hydrostatic transmission, whereby the plates are sequentially positioned to vary the displacement and to control the speed of the hydraulic transmission. The servos each comprise a servo piston which is movable in a servo cylinder, wherein two pressure chambers are located on opposite sides of the servo piston. In each pressure chamber a servo spring is arranged that abuts on one side against the servo piston and on the other side against the ground of the servo cylinder bore. The pressure chambers are pressurized and depressurized according to remote hydraulic control signals. Piston rods are fixed to the central parts of the servo pistons in order to transmit the servo piston movement to a mechanical leverage device connected to the respective swashplate.

SUMMARY

It is therefore an objective of the invention to provide a hydraulic servo unit which can be used in combination with various types and versions of hydrostatic variable displacement units and which comprises a robust, reliable, economic and easily adjustable centering mechanism and whose center position is adjustable even after the installation of the servo unit.

The objective is reached by a hydraulic servo assembly unit for being arranged inside, outside or distant from a variable displacement hydrostatic unit and for controlling the displacement of the variable displacement hytdrostatic unit, the servo assembly unit comprising a servo housing in which at least one servo piston is arranged whose piston head can be pressurized such that the servo piston can move linear relative to a servo cylinder formed in the servo housing, wherein the servo assembly unit comprises a movable output element protruding outside of the servo housing, which can be mechanically coupled to a displacement element of a variable displacement hydrostatic unit, a hydraulic variable displacement unit having a casing to which the hydrostatic servo assembly unit can be attached to such that the second end of the eccentric mechanism directly or indirectly can move a displacement element of the variable displacement hydrostatic unit in order to set the displacement volume of the variable displacement hydrostatic unit, a hydrostatic transmission with at least one variable displacement pump and one hydrostatic motor including a common transmission casing to which the hydrostatic servo assembly unit can be attached to, such that the second end of the eccentric mechanism directly or indirectly can move a displacement element of the variable displacement hydrostatic pump in order to set the displacement volume of the variable displacement hydrostatic pump and a working machine including the hydrostatic unit or the hydrostatic transmission, wherein the pilot valves of the servo assembly unit are controlled according to command signals given to a control unit by an operator of the working machine. Preferred embodiments of the devices according to the invention are indicated in the subclaims directly or indirectly dependent on the respective independent claim.

A hydrostatic servo unit for controlling the displacement of a variable displacement hydrostatic unit according to the invention comprises a servo housing in which at least one servo piston is arranged. The servo piston is arranged in a servo cylinder which is formed in the servo housing. A piston head of the servo piston can be pressurized such that the servo piston can move linear relative to the servo cylinder. Further, the servo unit according to the invention comprises a movable output element protruding outside of the servo housing which can be mechanically coupled to a displacement element of a variable displacement hydrostatic unit. According to the invention, the output element can be movable linear. However, the output element can also be rotatable. The type of motion which is conducted by the output element depends on the interface provided by the displacement element of the variable displacement hydrostatic unit. The hydrostatic servo unit according to the invention is provided as separate assembly group with its own housing. It can therefore be arranged inside, outside or distal from the casing of the variable displacement hydrostatic unit and can be used and sold separately from a variable displacement hydrostatic unit. According to the invention, the movable output element provides the interface by means of which hydraulic servo pressure is converted by the hydrostatic servo unit into mechanical adjustments of the displacement element for controlling the displacement of a variable displacement hydrostatic unit.

A servo piston rod of the servo piston can be operatively connected to a first end of an eccentric mechanism such that a second end of the eccentric mechanism rotates when the servo piston is moving. Thereby the linear, translational movement of the servo piston is converted to rotational movement of the second end of the eccentric mechanism is then, for example, capable of tilting a displacement element of a variable displacement hydrostatic unit.

The eccentric mechanism can be located inside of the housing of the hydrostatic servo unit according to the invention. In this case, the second end of the eccentric mechanism protrudes outside the housing and acts as movable output element which can be mechanically connected to a displacement element.

Alternatively the eccentric mechanism can be located outside of the servo housing of the servo unit according to the invention. The servo piston rod protrudes outside of the housing of the servo unit and is operatively coupled to the first end of the eccentric mechanism. This means that in this embodiment the servo piston rod serves as movable output element. Similar to the previous descript embodiment, the eccentric mechanism converts the linear motion of the servo piston rod into rotational motion at the second end of the eccentric mechanism. In many applications, the servo unit according to the invention is attached to the casing of a variable displacement hydrostatic unit. In this case, the eccentric mechanism can be arranged inside the casing of the variable displacement hydrostatic unit or outside of the casing of the variable displacement hydrostatic unit.

Depending on the arrangement of the eccentric mechanism inside or outside the housing of the servo unit, the movable output element can either be the servo piston rod or the second end of the eccentric mechanism. If the movable output element is the servo piston rod, a linear movement is provided at the output of the servo unit according to the invention, which will be the preferred option, when a servo unit shall be provided to control a variable displacement hydrostatic unit requiring a linear mechanical control input, e.g. if an eccentric mechanism is integrated between the mechanical control input of the variable displacement hydrostatic unit and the displacement element. If—as in most applications—a rotational control input is required to control the displacement of the hydrostatic unit, the eccentric mechanism can be provided outside of the casing of the variable displacement hydrostatic unit and outside of the housing of the servo unit.

Alternatively, the eccentric mechanism can be provided externally of a casing of a variable displacement hydrostatic unit and inside the housing of the servo unit which is preferred, as this provides a unified interface of the servo unit to all hydrostatic units which require a rotational displacement control input without providing additional parts. In this case, the movable output element, i.e. the second end of the eccentric mechanism, is rotatable.

The servo piston can comprise two piston heads each sealing a pressure chamber in the housing. Outwardly facing front faces of the piston heads can be pressurized by a servo pressure in order to move the servo piston.

The servo housing of the inventive hydrostatic servo unit can comprise two pressure chambers which are arranged coaxially along a longitudinal bore axis. These pressure chambers can be formed by end caps which are arranged at opposite sides of the housing and seal the inside of the housing from the outside. Each end cap comprises an internal cavity that is internally sealed by one piston head of the two head piston. By doing this, pressure chambers are formed by the outwardly facing front face of each piston head and the inwardly facing cavity of the end caps. The two head servo piston can further comprise a piston rod that projects outwardly from the housing to transmit the linear piston movement mechanically to, e.g., a displacement element of the variable displacement hydraulic unit.

Each of the pressure chambers can be fluidly connected to a pressure source which is capable of providing (controlled) servo pressure to the connected pressure chamber. For draining hydraulic fluid from that pressure chamber which is not pressurized by the servo pressure, the pressure chamber can be fluidly connected to a hydraulic reservoir such that the two head servo piston is moveable to either side by charging one outward facing piston surface in one pressure chamber and simultaneously draining hydraulic fluid from the other pressure chamber to a hydraulic reservoir at low pressure, e.g. a tank or a compensation reservoir.

Additionally, at least one servo spring can be arranged between the two piston heads of the two head servo piston. The at least one spring is seated on two spring seats each with a radially outer portion and a radially inner portion. The radially outer portions are located further away from the longitudinal bore axis than the radially inner portions. In the assembled state, the radially outer portions of the spring seats abut against the inner rings of the end caps, whereas the radial inner portions are moveable by the piston heads. In other words the inwardly facing servo piston surface is designed such that the two head servo piston is capable of compressing the at least one servo spring when a pressure force is acting on the outwardly facing servo piston surface. The other end of the at least one servo spring abuts by means of the radially outer portions of the correspondent spring seat against the inner edge of the end cap of the other, opposite pressure chamber not being charged by servo pressure.

It is obvious to a person skilled in the art that the assembling order and the particular design of the hydraulic servo unit and mainly of the two head servo piston depend on the number of springs used. The use, for instance, of only one spring that is arranged around the piston skirt between the two piston heads requires an at least two part design of the servo piston, as the two piston heads comprise a greater diameter than the radially inner region of the servo spring or the servo spring seat. Hence, for this embodiment one piston head of the two head servo piston is preferable detachable.

However, a one-part-design of the servo piston is possible too, when at least two smaller springs are used that do not surround the piston rod, but are arranged equidistantly with respect to the longitudinal bore axis on correspondent spring seats and can be therefore inserted between the two piston heads perpendicularly to the longitudinal bore axis. In implementation of this embodiment the use of a plurality of springs arranged in circumferential direction is possible and only the two spring seats at either side of the inwardly facing piston head surfaces abutting against the end caps inner contour have to be suitable to fix them in the circumferential direction. For this, e.g., the spring seats may comprise an open ring structure or any other suitable design to be mountable on the servo piston skirt area between the two piston heads.

In one embodiment, the two head servo piston shows a general bone-shape with a smaller diameter area between the two piston heads, similar to a bone. Preferable, within the bone shaped body in a central longitudinal bore the piston rod is mounted, such that one end of the piston rod is fixed to one piston head and the other end projects to the outside of the housing of the servo unit according to the invention. In a variation of the two headed servo piston, one of the piston heads is formed integrally with the piston skirt together with the piston rod. Further embodiments and solutions within the range of the knowledge of a person with skills in the relevant art are covered by the spirit of the invention, as long as the servo piston shows bone shaped portion with a piston rod extending therefrom. This give the servo piston according to the invention also a cross section similar to a double-T, with different or equal diameters for the piston heads and also for the shaft portions between and outside the piston heads.

For instance, to move the two head servo piston, a pressure source provides a high pressure to a first pressure chamber and the second pressure chamber is connected to a hydraulic sink. Due to the pressure difference at the two outwardly facing front faces of the servo piston, the two head servo piston, and especially the piston rod, will move towards the pressure chamber with the lower pressure. With ongoing movement the piston head sealing the pressure chamber under higher pressure exerts a force on the radially inner part of the servo spring and the servo spring is compressed, wherein the servo spring abuts via its radially outer part against the end cap on the side of the pressure chamber with the lower pressure. The movement will stop, when the force, which is exerted on the outer front face of the high pressure servo head, equals the counteracting/restoring force of the spring.

If both pressure chambers are on equal pressure, e.g., connected to a hydraulic reservoir, e.g. to a tank via pilot valves, the two head servo piston is centered, as the at least one servo spring abuts with its inner regions against both piston heads of the servo piston and at the same time with its radially outer regions against the end caps stationary with the servo unit housing. As these positions for abutment on the inner ends of the end caps define an exact stop for the servo spring, the two head servo piston will always realign itself in exactly this centering position, when the hydraulic force on the outwardly facing front faces of the two head servo piston are equal or lower than the servo spring force, no matter to which position the two head servo piston was moved before.

In a preferred embodiment of the invention the position of the end caps, i.e. their inner ends, are adjustable, for instance, by screwing in or out at least one of the two end caps into or out of the servo unit housing. As this in a preferred embodiment can be done independently for both end caps, the center position can be adjusted/moved in the longitudinal direction according to the tolerance situation at the apparatus for which the servo unit according to the invention is used. As the servo unit preferable is mounted outside the housing of, e.g., a hydrostatic variable displacement unit, the adjustment can be done, e.g. when bringing hydrostatic variable displacement unit into service or at a later point of time during maintenance or service of the hydrostatic unit or the like.

However, not only the center position can be adapted to the device to be controlled/actuated by the inventive servo unit, e.g., a hydrostatic variable displacement unit, since also the biasing/prestressing/restoring force of the servo spring(s), for example to adjust the servo unit hydraulic pedal forces or other actuation forces, can be set according to the necessities of the appliance for which the servo unit should be used.

In one embodiment of the invention the two piston heads of the two head servo piston comprise different diameters. With this design it is possible, to adjust a pressure ratio between the first and the second pressure chamber, which is necessary to move the two head servo piston. In a preferred embodiment, the diameters of the two piston heads are designed such that the surface size of the outwardly facing front faces on which the hydraulic pressure can act on, are equal. Especially, when the piston rod is protruding from one outwardly facing front face through the corresponding pressure chamber to the outside of the housing of the servo unit, the surface form on which pressure can act on is not equal for both of the piston heads, as the piston rod cross section covers part of the outwardly facing servo piston head surface. Accordingly it is preferred to adjust the diameter of the piston head from which the piston rod protrudes to a greater diameter, such that equal pressure surface sizes can be used to move the two head servo piston in both directions. As the servo unit preferably is mounted outside a casing of a hydraulic unit to be controlled, the design possibilities on both sides of the two head servo piston offers a great range of possible applications for which the servo unit according to the invention can be used. In particular the diameter ratio of the pressure chambers has not to be adjusted to a particular application, i.e. a hydraulic unit, and a servo unit according to the invention can be used not only for different volumetric sizes within a series of hydrostatic units or the like, but also for different series of hydraulic units or even non-hydrostatic devices. This positive effect is enhanced further, if the eccentric mechanism is arranged inside of the housing of the servo unit according to the invention. This provides an even higher unity of interfaces between the servo unit and the apparatus, the servo unit is installed to.

In one embodiment of the invention the pressure chambers are directly hydraulically connected to a hydraulic source and a hydraulic reservoir, for instance of a hydraulic steering circuit or a hydraulic pedal. Hydraulic fluid pressure generated this way can act directly on the outwardly facing front faces of the servo piston. In this case it is covered by the invention that a hydraulic sub-circuit, like a charge pressure circuit, e.g., is hydraulically arranged between the pressure source/reservoir and the pressure chambers of the servo unit.

In another embodiment of the invention the pressure in the pressure chambers is controlled by means of pilot valves which are actuable mechanically, hydraulically and/or electro-magnetically. Thereby an inlet of the pilot valves is connected to a pressure source providing hydraulic fluid under elevated pressure, one outlet of the pilot valve is connected to the respective pressure chamber and another outlet to a hydraulic fluid reservoir. In this exemplary configuration hydraulic fluid under elevated pressure can be guided from the pressure source to the connected pressure chamber when the pilot valve is open and hydraulic fluid can be drained from the connected pressure chamber when the pilot valve is in its closed position. Therefore, the pilot valve according to the described embodiment is a three/two-way valve comprising one inlet, two outlets and two valve positions. However, a person skilled in the art may apply different designs and types of valves to guide high and/or low pressure to the pressure chambers of the hydraulic servo unit.

The pilot valves may additionally be equipped with pressure compensation means in order to achieve a constant flow rate through the valve even for varying pressure drops over the valves. In an embodiment of the invention the pilot valves comprise a supply port which is hydraulically connected to a pressure source, for instance, a hydraulic charge pressure line. To a person skilled in the art it is obvious that a variety of other hydraulic pressure sources can be connected to the supply port of the pilot valve.

In one embodiment of the invention each of the pilot valves comprises a pilot valve spool with two opposing front surfaces on which forces can act. E.g., on a first surface a pilot valve spring is arranged which exerts a force on the surface that holds the pilot valve spool in its first, closed position in which the pressure chamber is connected with the hydraulic reservoir. The pilot valve can be actuated to the second, open position in which the pressure chamber and the inlet port of the pilot valve are hydraulically connected by an actuating force on an opposing second front face, which actuating force acts in a direction reverse to the force of the pilot valve spring. Different methods to exert such an actuating force are available to a person skilled in the art, for example hydraulic, mechanical or electro-magnetical actuators could be applied.

In a preferred embodiment the pilot valves are actuated using solenoids that receive an electric signals and apply a corresponding force on the second front face by means of electromagnets. In another preferred embodiment the electric signal which is received by the solenoids, is sent by a control unit receiving mechanical or electronic feedback about the position of the displacement element of the variable displacement hydraulic unit or commands from an operator of a working machine via joystick input, e.g. The control unit calculates control signals from the received feedback signals or the joystick signals which are then sent to the solenoids for actuation of the pilot valves. However, the pilot valves are in other embodiments actuable by mechanical forces which are, e.g., exerted by a leverage system or by a hydraulic pressure in a pressure chamber adjacent to the actuating front face.

Additionally, it is covered by the invention that the inlet ports, i.e. the supply ports and the drain ports of the pilot valves, are connected to the same pressure source and/or pressure sink, respectively, or to different pressure sources and/or pressure sinks.

Preferably, the pilot valves are arranged in or at the same housing as the hydraulic servo unit, but it is also possible to arrange them separately at a hydraulic system and connect them to the servo unit with hydraulic pipes, for instance.

The hydraulic servo unit according to the invention can be applied to control the displacement of a variable displacement hydrostatic unit. A variable displacement hydrostatic unit comprises a casing to which a hydrostatic servo assembly unit according to the invention can be attached to. The second end of the eccentric mechanism can directly or indirectly move a displacement element of the variable displacement hydrostatic unit in order to set the displacement volume of the variable displacement hydrostatic unit.

According to one embodiment of the invention the servo unit is arranged inside or outside of a casing of the hydrostatic unit and the displacement element is basically arranged inside of the casing of the hydrostatic unit. The second end of the eccentric mechanism is mechanically coupled to the displacement element of the hydrostatic unit, for instance a swashplate or a yoke.

Many variable displacement hydrostatic units require a rotation or tilt movement of the displacement volume control means to adjust the displacement volume of the hydraulic unit. Hence, in a preferred inventive embodiment the eccentric mechanism converts the linear motion of the piston rod to rotational motion which can be transferred to the displacement element. A person skilled in the art is familiar with many other ways to convert linear motions to rotational motions. All these methods are also covered by the invention. In the present application it is preferred to use an eccentric mechanism in which a piston rod is in operative connection via an elongation leverage connected to the variable displacement volume control means at a position which is located distant from the center of rotation of the displacement element. Therefore, a linear movement of the piston rod is translated into a rotation/tilt of the displacement element.

Due to the mechanical coupling the servo unit can be arranged at the inside or at the outside of a casing of the variable displacement hydrostatic unit, or remote from the variable displacement hydrostatic unit, e.g. It is widely known from the prior art that servo units are integral part of the casing of the apparatuses which are controlled by these servo units. However, arranging the servo units at the outside of the casing of the apparatus provides numerous advantages over the predominant design of the prior art.

As the servo system is not an integrated part of the device, e.g., a hydrostatic unit, the servo unit is easily interchangeable in case of a component failure. Furthermore, the servo unit can be assembled to different volumetric designs or different types of hydrostatic units or devices, which leads to a bigger unification and smaller manufacturing costs. It is also accessible, if, for instance, adjustments to the centering position of the servo unit have to be done in order that the centered position of the servo unit corresponds exactly to the neutral position of the variable displacement hydraulic unit or any other device, that these adjustments can be done easier and also after the servo unit has been assembled into the superordinate system.

The hydrostatic servo unit according to the invention can be arranged freely in relation of the hydrostatic unit which leads to a higher degree of freedom when designing a hydrostatic unit or a working machine. The same hydrostatic servo assembly unit can be used in different applications and correspondingly in different positions of the hydrostatic servo units, only the mechanical coupling has to be adapted to the superordinate system or device. The mechanical coupling by means of an eccentric mechanism provides the connection between the servo system of the invention and the controlled apparatuses and is therefore to be routed through the casing of the device/apparatus. Furthermore, the hydraulic unit/the apparatus can be designed smaller as the servo unit is mountable remote from the hydraulic unit/apparatus. By doing this, e.g., hydrostatic transmission can be designed even smaller as no mounting space for the servo unit is required inside of the casing of the hydraulic unit.

Preferably the exemplary disclosed variable displacement hydrostatic unit is a hydrostatic pump or a hydrostatic motor. Even more preferably the hydrostatic unit is of axial piston or for radial piston design.

In one embodiment of the invention the hydrostatic servo unit is used to control the transmission ratio of a hydrostatic transmission, wherein the hydrostatic units comprised by the hydrostatic transmission are connected via an open circuit or a closed circuit. In such a hydrostatic transmission according to the invention it is possible to control the displacement of one of the hydrostatic units remotely with the hydrostatic servo system. It is also covered by the invention that more than one hydrostatic displacement unit and/or more than one hydrostatic transmission are controlled by more than one inventive hydrostatic servo unit or that one inventive hydrostatic servo unit controls more than one hydrostatic unit of the hydrostatic transmission.

The hydrostatic servo assembly unit according to the invention can also be used to form and control the movement of a steering unit that can exemplarily be arranged in a working machine, for instance an agricultural machine, e.g. a tractor. In such a working machine the servo assembly unit is controlled according to command signals from a control unit of the working machine. The machine's control unit receives its command signals from an operator of the working machine, e.g. A further possible use, e.g., of the present invention is as a moving mechanism, for flaps of a airplane or the like. In general, all devices/apparatuses which use a servo controlled linear bi-directional or a servo controlled rotational movement.

A person skilled in the art will derive that the inventive hydraulic servo unit, the inventive hydrostatic unit and other inventive embodiments are applicable on other pressure fluid units and are not limited to oil driven hydrostatic units.

BRIEF DESCRIPTION OF THE DRAWINGS

In the following an inventive hydrostatic servo unit is shown with the help of the attached Figures. However, the invention is not limited to the embodiments shown below even if not mentioned in the description. Different embodiments can be combined or modified by a person with ordinary skills in the art without leaving the scope of the inventive idea.

The Figures show.

DETAILED DESCRIPTION

Figure 1:
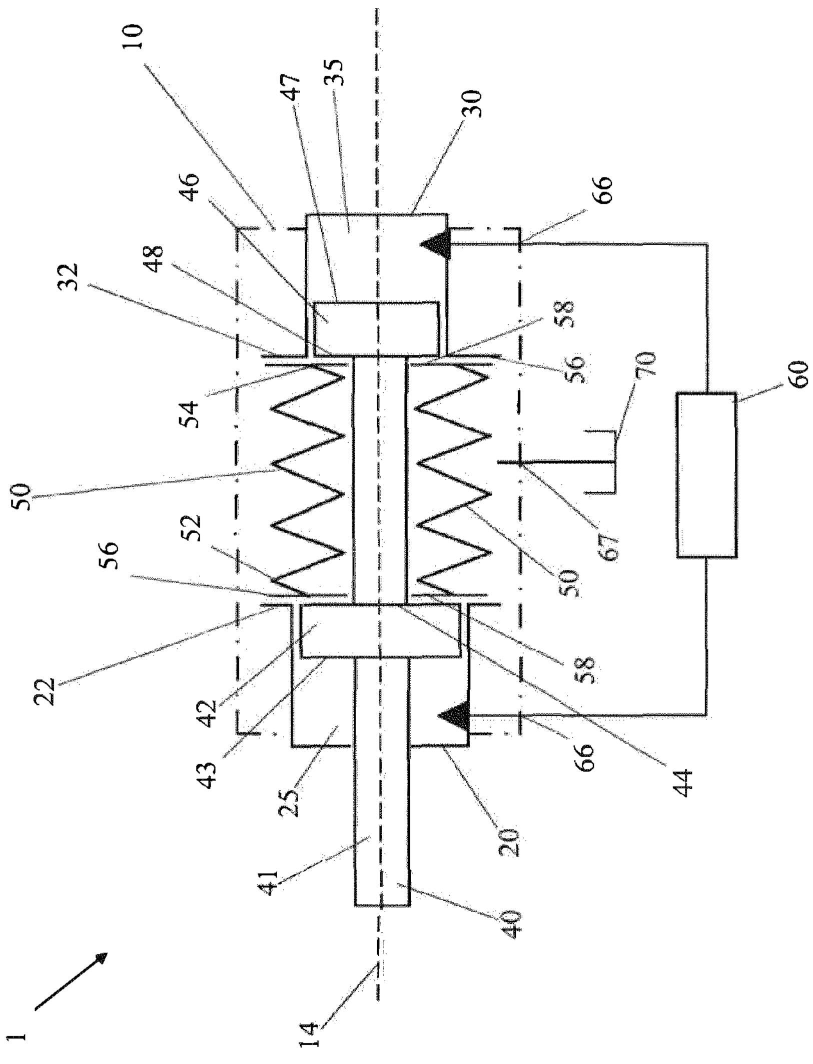
FIG. 1 a scheme of a hydrostatic servo assembly unit according to the invention in combination with a general actuation system.

FIG. 1 discloses a scheme of an embodiment of an inventive hydrostatic servo unit 1 which comprises a housing 10 (illustrated as dotted-dashed-line) within which two pressure chambers 25, 35 are arranged coaxially along a longitudinal bore axis 14 at opposing sides of the housing 10. Each of the pressure chambers 25, 35 is formed as a cup-shaped cavity in end caps 20, 30 which are arranged in the housing 10, wherein the cavities are open towards the inside of the housing 10. The openings of the end caps 20, 30 towards the inner of housing 10 are sealed on each side by a piston head 42, 46 of a two head servo piston 40. In consequence the pressure chambers 25, 35 are formed by interior surfaces of the end caps 20, 30 and the outwardly facing front faces 43, 47 of the piston heads 42, 46. The piston heads 42, 46 share a piston rod 41 that protrudes on one side through the pressure chamber 25 and through the corresponding end cap 20 towards the outside of the housing 10. Both pressure chambers 25, 35 are hydraulically connected to a pressure source 60 which can guide pressurized fluid as a servo pressure into the pressure chambers 25, 35, such that servo pressure can act on the outwardly facing front faces 43, 47 of the servo piston 40. Both pressure chambers 25, 35 can alternatively be connected to a hydraulic reservoir 70 which provides the possibility to drain fluid from the pressure chambers 25, 35. As a consequence, a pressure difference can be established over the two outwardly facing front faces 43, 47, which leads to a movement of the two head servo piston 40 including first and second piston heads 42, 46 and the piston rod 41 which is connected to at least one of the piston heads 42, 46.

In this embodiment, two servo springs 50 are arranged on opposing sides of the cylinder bore axis 14 between the first and second inwardly facing front faces 44 and 48 of piston heads 42, 46 of the servo piston 40. Each of the servo springs 50 abuts against two spring seats 52, 54, wherein one is located on either side of the servo springs 50. The spring seats 52, 54 comprise a radially outer portion 56 which is in a centered/initial position pushed against an end surfaces 22 and 32 of the endcaps 20, 30, such that the servo springs 50 are centered between the end caps 20, 30. The radially inner portions 58 of the spring seats 52, 54 can be contacted by the first and second inwardly facing front faces 44 and 48 of piston heads 42, 46.

In the centered position of the servo piston according to the invention both springs 50 are on both sides in contact with the first and second spring seats 52, 54 which are with their radially outer regions 56 in contact with the end surfaces 22 and 32 of end caps 20 and 30 as well as with their radially inner regions 58 in contact with the piston heads 42 and 46. It is obvious to a person skilled in the art that this centering position can be adjusted when the position of the inner end surfaces 22, 32 of the end caps 20, 30 is changed, wherein, e.g., the distance between the two end-caps 20, 30 can be kept constant. However, depending on the application it can be also desired to change the distance between the inner end surfaces 22, 32 of the two end caps 20, 30, in order to adjust the pretension of the servo springs 50. This will lead to a more or less strong restoring behavior as shown in the next paragraph.

Each piston head 42, 46 when being pressurized at its outwardly facing front face 43, 47 can compress the springs 50 by means of a movement in a direction towards the spring 50, respectively towards the other (non-pressurized) pressure chamber 25 or 35. This movement of the two head servo piston 40 is transduced via the spring seats 52, 54 onto the adjacent end of the springs 50. However, the springs 50 abut against the end surfaces 22 and 32 of end caps 20 and 30 via the radially outer portions 56 of the spring seats 52, 54 on the opposite side of the servo springs 50. This leads—with ongoing of the movement of the servo piston 40—to an increasing compression of the servo springs 50 which in consequence exert a force counteracting the movement of the servo piston 40. The servo piston 40 will move as long as the counteracting spring forces are lower than the result of the hydraulic force balance on the outwardly facing front faces 43, 47. If the spring force and the resulting hydraulic force are equal, the servo piston 40 remains in its current position. However, if the servo piston 40 is deflected from the centered position and the resulting hydraulic force is smaller than the restoring spring force, e.g., if hydraulic fluid is drained from a pressurized chamber, the servo piston 40 will be pushed back towards its centered position by the force of the servo springs 50. Thereby, the spring forces decreases with ongoing movement towards the center position until the servo piston 40 reaches the center/initial position, in which the correspondent spring seat 52 or 54 contacts the inner end surface 22 or 32 of the end caps 20 or 30, having served before as pressure chamber 25 or 35.

In the embodiment shown in FIG. 1 the piston rod 41 protrudes through the first pressure chamber 25 to the outside of the housing 10. If the two piston heads 42, 46 comprised the same diameter, different servo pressures would be required in the sealed pressure chambers 25 and 35 to obtain the same moving distance of the servo piston 40. In the embodiment of FIG. 1 the part of surface of the two outwardly facing front faces 43, 47 on which pressure can act is of equal size, as no pressure can act on the surface area which is covered by the connection of the piston rod 41 to the piston head 42. To enhance the modular usability of the inventive servo unit, it is desirable to establish a pressure surface size ratio equal to 1 between the two outwardly facing front faces 43, 47. This means, that a particular pressure difference will lead to a particular movement of the servo piston independently which pressure chamber 25, 35 comprises the higher pressure. Therefore, in the embodiment according to FIG. 1 the first piston head 42 comprises a greater diameter than the second piston head 46. This compensates the surface loss due to the piston rod connection and leads to a well-balanced movement independently from the movement direction.

According to the invention, the pressure chambers 25, 35 of the servo unit 1 comprise hydraulic connection ports, i.e. at least one drain port 67 and at least one supply port 66, which can be directly connected to a hydraulic sink 70 and/or a hydraulic reservoir 70. Even though FIG. 1 does not show any additional hydraulic components that are arranged between the hydraulic source 60/reservoir 70 and the pressure chambers 25 & 35 the inventive concept covers the idea of arranging other hydraulic circuits between the connection ports of the servo unit 1, e.g. a control circuit of a hydraulic steering assembly.

Figure 2:
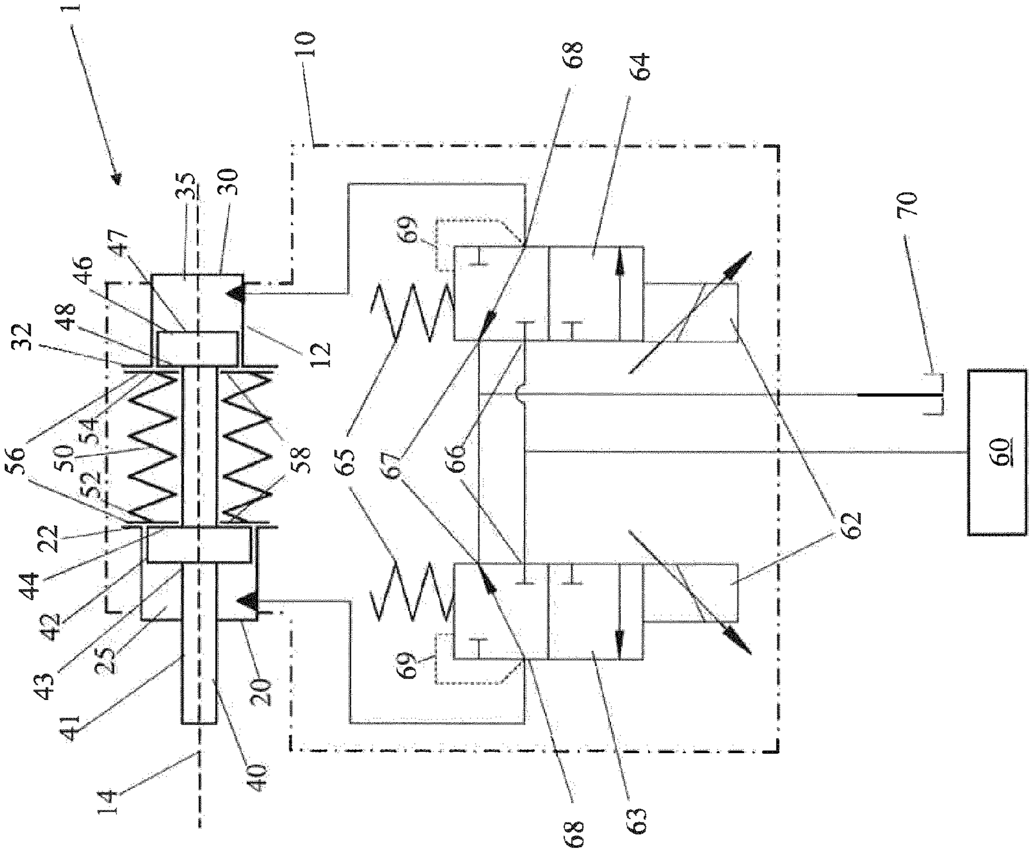
FIG. 2 a scheme of a hydrostatic servo assembly unit according to the invention with a pilot valve actuation system.

FIG. 2 shows another embodiment of an inventive hydraulic servo unit 1. In this embodiment, the pressure chambers 25, 35 of the servo unit 1 are connected to the pressure source 60 and the hydraulic reservoir 70 via pilot valves 63, 64, wherein the outlet 68 of a first pilot valve 63 is hydraulically connected to the first pressure chamber 25 and the outlet 68 of a second pilot valve 64 is hydraulically connected to the second pressure chamber 35. Each pilot valve 63, 64 comprises a supply port 66 which is connected to a pressure source 60, e.g. a charge pressure line, and a drain port 67 is connected to a hydraulic reservoir 70, e.g. a hydraulic tank.

In a pressure less state, the pilot valves 63, 64 according to the embodiment of FIG. 2 are in a first, closed position in which the corresponding pressure chambers 25, 35 are connected hydraulically via the pilot valve 63, 64 to the hydraulic reservoir 70. In a second, open position of one of the pilot valves 63 or 64 a corresponding pressure chamber 25, 35 is connected with the pressure source 60 and a servo pressure is guided by one of the pilot valves 63, 64 from its supply port 66 via the outlet 68 to the pressure chamber 25 or 35. The respective other pressure chamber 35 or 25 remains on the pressure level of hydraulic reservoir 70 as the second pilot valve 64 or 63 remains in its first, closed position in which the supply port 66 is closed and draining of hydraulic fluid from the correspondent pressure chamber 35 or 25 to the hydraulic reservoir 70 is enabled.

Each pilot valve 63, 64 comprises two front faces on which actuation forces can be applied. On a first front face a pilot valve spring 65 is arranged, which abuts against the front face and holds the pilot valves 63, 64 in its first, closed position, as long as an actuation force exerted on the opposing second front face is lower than the spring force on the opposite front face. Additionally a hydraulic feedback line 69 can guide hydraulic pressure from the outlet 68 of the pilot valves 63, 64 to the first front face. This hydraulic pressure exerts an additional closing force on the pilot valve spool proportional to the servo pressure guided to one of the pressure chambers 25 or 35.

Actuators 62 are arranged on the spring 65 opposing second front face of the pilot valves 63, 64 and can act on the front faces with an opening actuation force, such that the pilot valves 63, 64 are shifted to a second, open position, when the actuators 62 are energized, e.g. In the embodiment according to FIG. 2 the actuators 62 are solenoids receiving an electrical control signal from a control unit (not shown) and exerting a corresponding force on the second front face. Although solenoids are shown in FIG. 2 as actuators 62, other types of actuators are covered by the inventive concept as well, e.g. mechanical actuators or hydraulic actuators.

Figure 3:
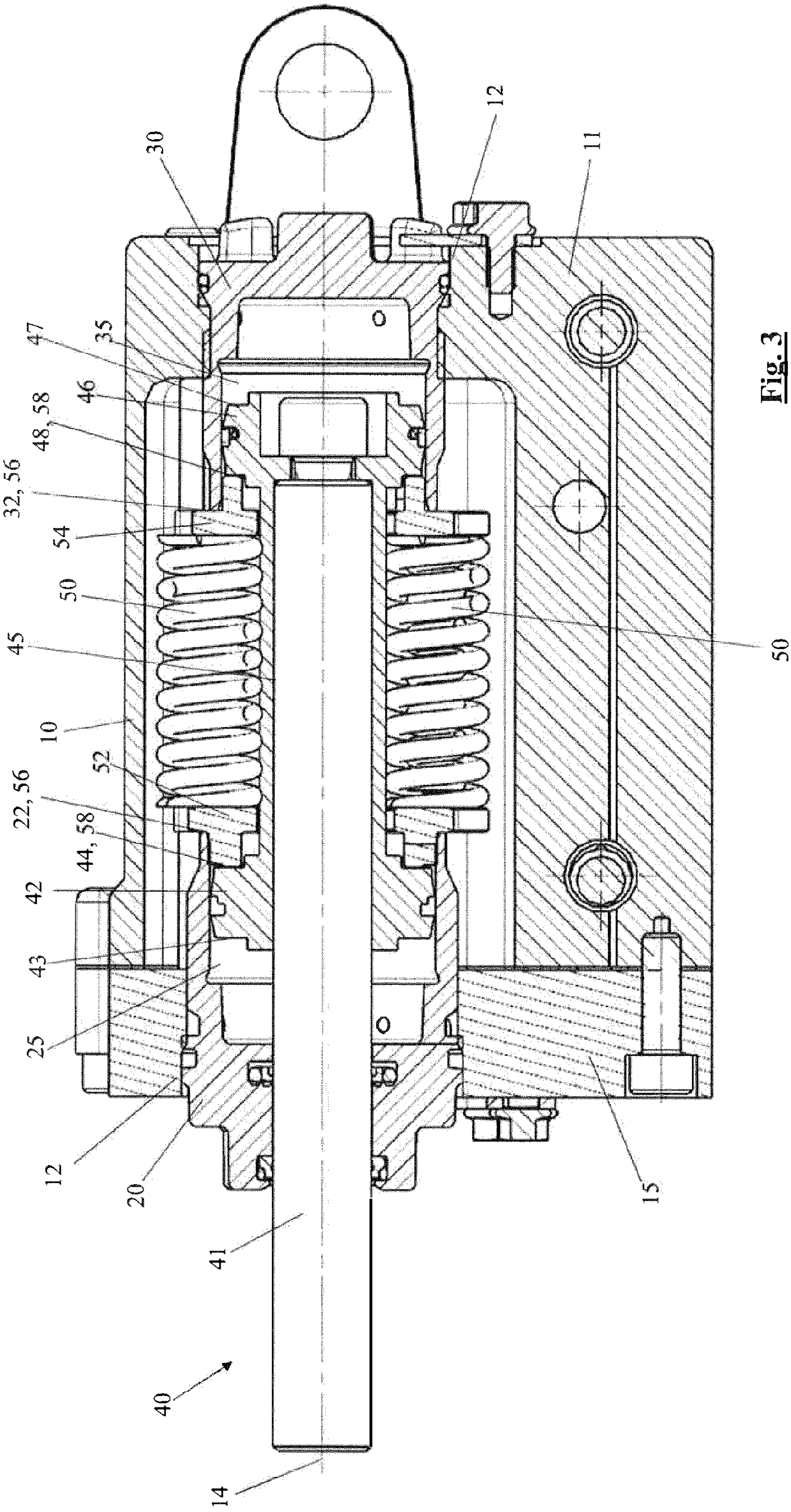
FIG. 3 a section of a hydrostatic servo assembly unit according to the invention.

FIG. 3 discloses a sectional view of an inventive hydrostatic servo unit 1. The housing 10 in this embodiment comprises a housing base 11 and a housing lid 15 which is connected to the housing base 11 in a fluid tight manner. Attention is drawn to the first and second end caps 20, 30 which are accommodated by threads arranged in longitudinal bores 12 of the housing 10. These threads provide the possibility of adjusting independently the position of the end caps 20, 30 relative to each other. The connection surfaces between end caps 20, 30 and housing 10 may be sealed against leaking fluid as well as the connection surfaces between the piston heads 42 and 46 with the end caps 20, 30. Although not shown in FIG. 3, it is covered by the invention to form at least one of the end caps 20, 30 integrally with the housing 10, in particular with the housing base 11 and/or the housing lid 15.

The spring seats 52, 54 according to the embodiment shown in FIG. 3 comprise a T-shaped cross section, providing a large-scale contact-area for the servo springs 50 on the associated inwardly facing front face 44 or 48. The radially outer portion 56 of the spring seats 52 & 54 contact the end caps 20, 30 at their inner ends 22 or 32, respectively. Additionally, hollow-cylinder shaped radially inner area 58 are provided that can simultaneously serve as a guidance for the movement of the servo spring 50 in the direction of the longitudinal bore axis 14.

The servo piston 40 shown in FIG. 3 comprises a basically bone-like shape with a central longitudinal bore 45, in which the piston rod 41 is arranged. The piston rod 41 is attached to the second piston head 46 in a detachable manner using a screw that is accommodated by a thread arranged in the piston rod 41. The piston rod 41 projects outwardly of the housing 10 on the opposite side of the servo assembly unit 1. A multi-part design of the piston 40 can facilitate the assembling process of the servo unit 1, especially if only one servo spring 50 or one-part circumferential spring seats 52, 54 are used that surround the bone like servo piston 40. Then, splitting the two piston heads 42, 46 in different assembly units provides the possibility to arrange the surrounding parts on the bone shaped piston. However, an integral design of the two head servo piston 40 is also covered by the invention. This is especially advantageous, if more than one servo spring 50 is used and the spring seats 52, 54 are circumferentially split in more than one part.

Figure 4:
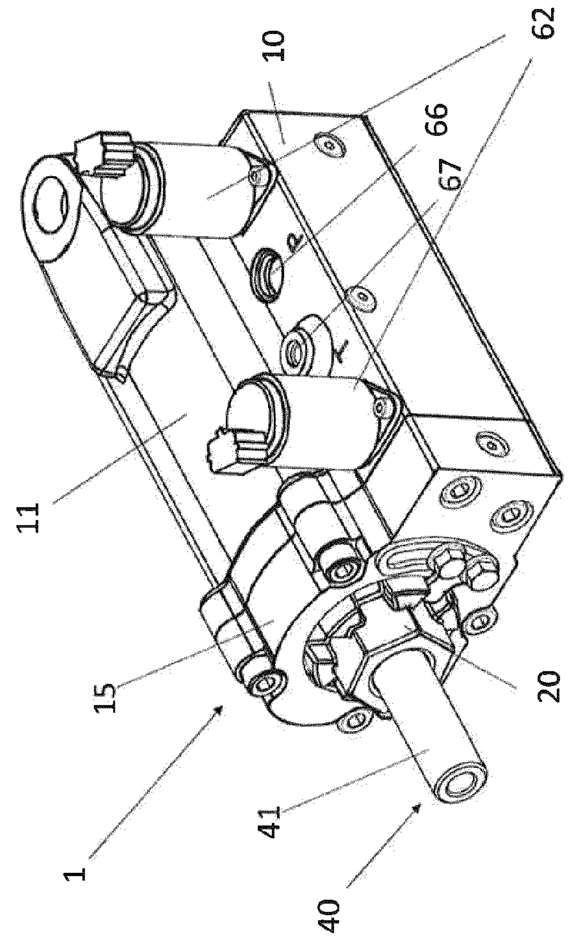
FIG. 4 an isometric view of a hydrostatic servo assembly unit according to the invention.

FIG. 4 shows an isometric view of an exemplary embodiment of a hydrostatic servo unit 1 according to the invention. The inventive servo unit 1 comprises a two part housing 10 with a housing base 11 and a housing lid 15. The two housing parts are connected in a releasable manner by the use of screws. At one side of the housing 10 the outwardly protruding end of the piston rod 41 is visible. The piston rod 41 is accommodated in the housing base 11 and/or the housing lid 15, such that it is movable along the cylinder bore axis 14. However, it is important that no fluid can leak through the bearing of the piston rod 41.

A supply port 66 and a drain port 67 are arranged at the side of the housing 10. These two ports enable a fluid connection of the pressure chambers 25, 35 of the inventive servo unit 1 to a hydraulic pressure source 60 and to a hydraulic reservoir 70, such that the two head piston 40 of the servo assembly unit 1 can be moved forced by servo pressure supplied to one of the pressure chambers 25, 35 and draining hydraulic fluid from the other pressure chamber 25, 35. However, in the embodiment shown in FIG. 4, the pilot valves 63, 64 (not visible in FIG. 4) are used to control the fluid flow to the pressure chambers 25, 35. The pilot valves 63, 64 are actuated, e.g., by solenoids 62, which convert an electric input signal to a mechanical force which can act on a front face of the one of pilot valve spools to move it (see also FIG. 2).

Figure 5:
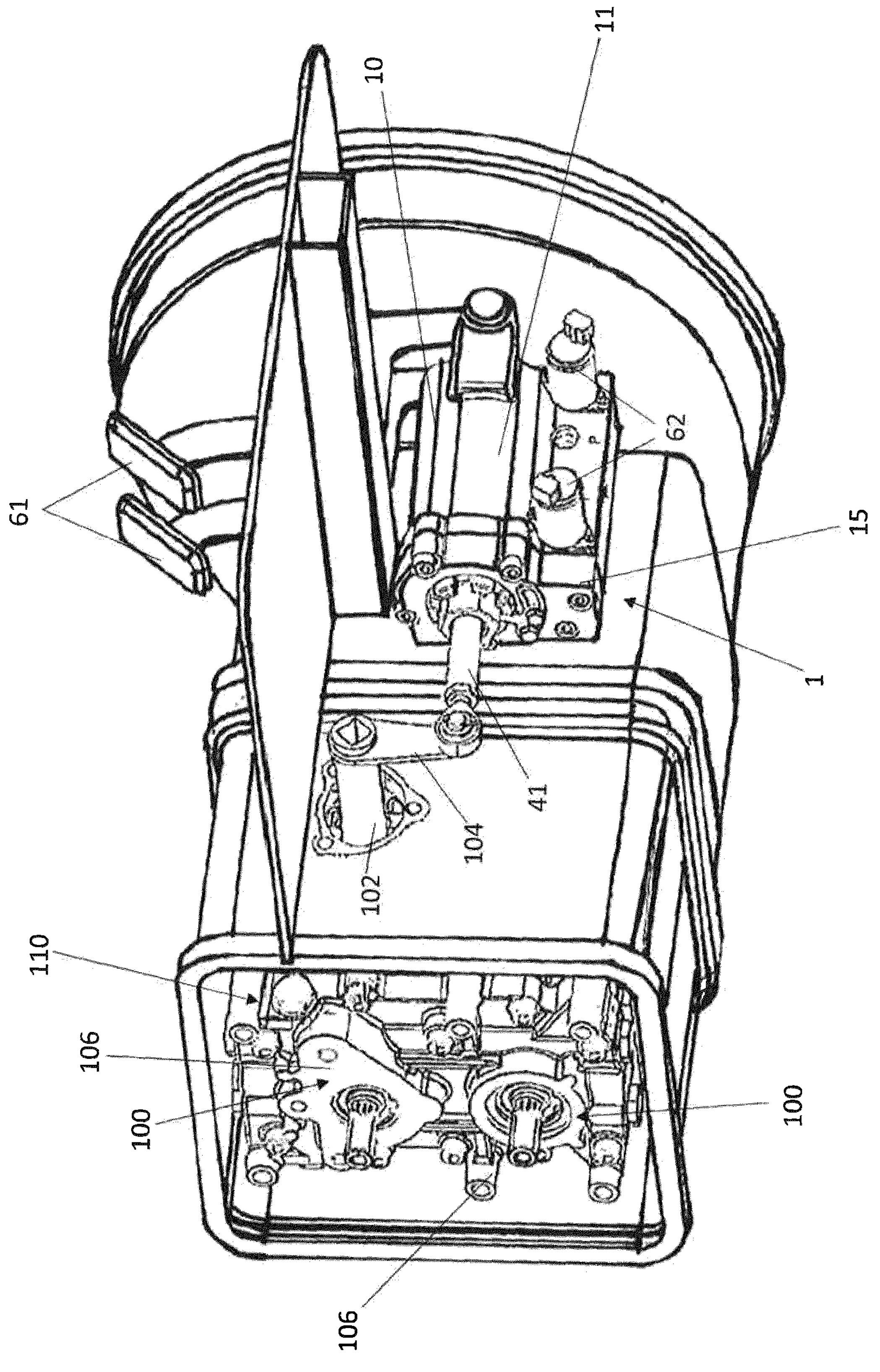
FIG. 5 an isometric view of a variable displacement hydrostatic unit with a remotely attached servo assembly unit according to the invention.

In FIG. 5 a hydrostatic transmission 110 with two variable displacement hydrostatic units 100 is shown. The general working principle of a hydrostatic transmission is familiar to a person skilled in the art. In the embodiment of FIG. 5, the hydrostatic transmission 110 comprises a hydraulic pump 100 with a variable displacement volume which pumps hydraulic fluid utilizing mechanical energy to a hydrostatic motor with a constant displacement, for instance. The motor converts the hydraulic energy to rotational mechanical energy. The transmission ratio of the hydrostatic transmission 110 is changed by adjusting the displacement volume of the pump 100 which, in consequence, conveys more or less hydraulic fluid flow to the motor. In the described embodiment, the displacement volume is adjusted by a tilting motion of the displacement element 102, in this case a swashplate with a control rod that is attached to the swashplate and protruding outwardly of pump 100. However, other types of hydrostatic transmission units 110 which may use a different number, type or arrangement of pumps and motors are also covered by the inventive concept.

The displacement element 102 of the hydrostatic unit 100 according to the invention is rotated by means of an inventive servo unit 1. The hydrostatic servo unit 1 is arranged at the outside of the casing 106 of the controlled hydrostatic unit 100. Therefore, the control rod of the displacement element 102 protrudes to the outside of the casing 106 of the hydrostatic transmission 110. The displacement element 102 is coupled with its outwardly facing end eccentrically coupled to the piston rod 41 of an inventive hydrostatic servo unit 1 which is also arranged at the outside of the casing 106. The eccentric mechanism 104 converts a linear motion of the piston rod 41 to a rotational motion of the displacement element 102. However, other mechanical methods to convert linear motion of the piston rod 41 to a rotational motion of the control rod are known by a person skilled in the art, e.g. a leverage or cam system. Even electronic or hydraulic concepts, for instance a sensor-actor system, that couple the linear moving piston rod 41 to the rotationally deflectable control means 102 can be applied.

In FIG. 5 two different concepts to pressurize the pressure chambers 25, 35 of the servo piston 1 are shown. The actuators 62 of pilot valves 63, 64 are arranged at the side surfaces of the housing 10 as already known from FIG. 4. Additionally, the servo assembly unit 1 can be actuated using drive pedals 61. These pedals 61 are connected to the pressure chambers 25, 35 of the servo unit 1 via a hydraulic sub-circuit, e.g. a control valve, which is not depicted.

Figure 7:
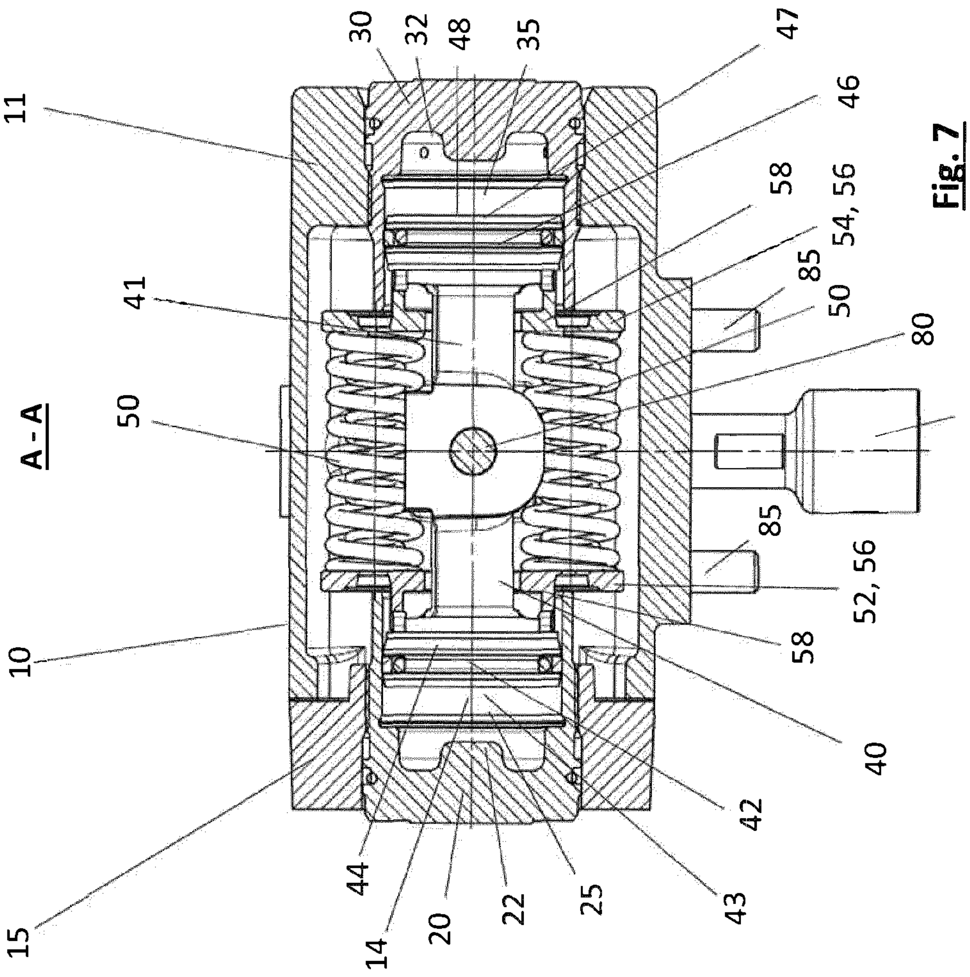
FIG. 7 a sectional view of the second embodiment of a hydrostatic servo assembly unit according to the invention.
Figure 6:
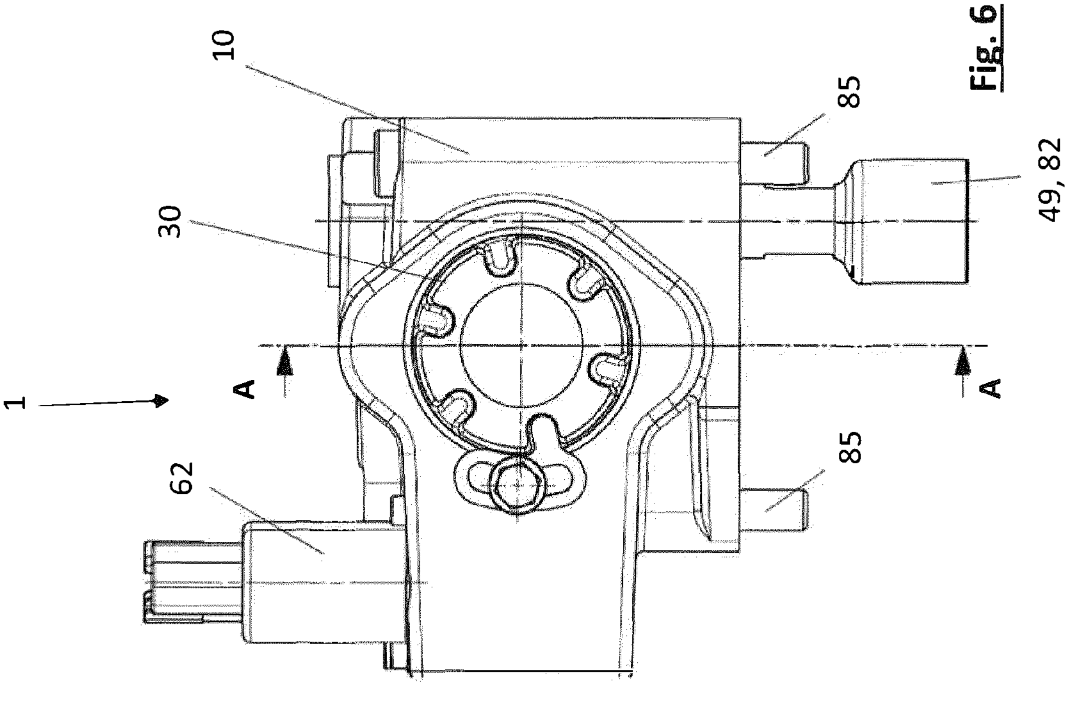
FIG. 6 a side view of a second embodiment of a hydrostatic servo assembly unit according to the invention.

FIG. 6 depicts a second embodiment of a hydrostatic servo assembly unit 1 according to the invention. FIG. 7 shows a sectional view along line A-A in FIG. 6.

The servo unit 1 comprises a movable output element 49 which is rotatable protrudes from the housing 10 of the servo unit 1. The movable output element 49 is the second end 82 of an eccentric mechanism 104 which transmits linear motion of a servo piston 40 (not shown) to rotational motion of the movable output element 49. The housing 10 of the servo unit 1 according to the invention is not formed integrally with the casing 106 of a variable displacement hydrostatic unit 100, but is provided separately. Therefore, the servo unit 1 according to the invention can be assembled independently from a variable displacement hydrostatic unit 100. As a consequence of this differential construction method, components of the hydrostatic servo unit 1 can be facilely attuned to each other during and after the assembling process of the servo unit 1. In particular, the center position of the servo spool can be adjusted/attuned easily to the neutral position of a hydrostatic unit 100 to be controlled with the hydrostatic servo assembly unit 1 according to the invention.

The housing 10 comprises a two part construction and is therefore formed by means of a housing base 11 and a housing lid 15 (see also FIG. 7). A two head servo piston 40 is slidably arranged in a longitudinal bore 12 in the housing 10 of the servo unit 1. The two head servo piston 40 comprises a first piston head 42 and a second piston head 46. Actuators 62 are provided on the side of the housing 10 which is located opposite to the movable output element 49.

The actuators 62 control the servo pressure in the pressure chambers 25, 35 which are formed between first and second outwardly facing front faces 43, 47 and the first and second endcaps 20, 30, respectively.

Servo springs 50 are provided which apply a centering force on the servo piston 40, if the servo piston 40 slides to one side from its centered starting position. The servo springs 50 abut on either side via spring seats 52, 54 on inner end surfaces 22, 32 of end caps 20, 30. Similar to the embodiment shown with FIG. 3, the springs 50 are simultaneously in contact with the radially inner portions 58 and the radially outer portions 56 of the first spring seat 52 and the second spring seat 54, when the two head servo piston 40 is in its starting position. The springs 50 can be inserted between the spring seats 52, 54 in a pre-tensioned, compressed manner, such that a force is simultaneously exerted on the radially inner portion 58 of the spring seats 52, 54 and on the radially outer portion 56 of the spring seats 52, 54 and the two head servo piston 40 is centered between shoulders of the housing 10. Thereby, the outer portion 56 is supported by the housing and the radially inner portion 58 is supported by the first or second inwardly facing front faces 44, 48 of the two head servo piston 40.

If one of the pressure chambers 25, 35 is charged with servo pressure and the other pressure chamber 35, 25 is simultaneously connected with a hydraulic reservoir 70, the servo piston will move towards the pressure chamber 35, 25 from which hydraulic fluid is discharged into the reservoir 70. The motion of the servo piston 40 is counteracted by restoring forces of the servo springs 50 which are compressed, when the servo piston 40 leaves its centered position. The motion of the servo piston 40 is transmitted via the inwardly facing front faces 44 or 48 to the radially inner portion 58 of the first spring seat 52 or second spring seat 54 to the springs 50. The spring seats 52, 54 are supported via the radially outer portions 56 at the housing on the opposite side of the springs 50 (the side towards which the servo piston 40 slides).

The two head servo piston 40 according to the embodiment of FIGS. 6 and 7 comprises a piston rod 41 which extends in the direction of the longitudinal bore axis 14. A first end 80 of an eccentric mechanism 104 is attached to the central part of the piston rod 41. The first end 80 is therefore in operative connection with the piston rod 41 and the longitudinal movement of the two head servo piston 40 is directly transmitted to the first end 80 of the eccentric mechanism 104 in order to rotate the second end 82. A person with relevant skills in the art will chose an appropriate joint connection between the piston rod 41 and the first end 80 of the eccentric mechanism 104 that provides appropriate freedom of movement. Thereby it can be for example preferable, to minimize the play of the joint connection in the direction of the longitudinal bore axis 14. For example, a ball connection which only transmits longitudinal/lateral movements and does not impede the rotational relative movement of the first end 80 of the eccentric mechanism 104. However, also a stiff joint, a sliding joint or an alternative joint connection may be selected by the person skilled in the art.

The linear/longitudinal motion of the first end 80 of the eccentric mechanism 104 is converted to rotational motion of the second end 82 which is in the embodiment according to FIGS. 6 and 7 the movable output element 49. The movable output element 49 protrudes from the housing 10 and provides a rotationally moving interface to the tilting displacement volume control means 102 for controlling the displacement of a variable displacement hydrostatic unit 100 (see FIG. 8, e.g.). The form and motion of the provided interface, i.e. the movable output element 49, can preferably be standardized, such that one model of hydrostatic servo unit 1 can control the tilt angle of various types and models of displacement control means 102. This decreases the complexity of an assembly consisting of a variable displacement hydrostatic unit 100 and a separate servo unit 1 according to the invention. Due to the higher number of common and generic parts, the servo unit 1 according to the invention is therefore capable of facilitating the assembling process and of enhancing the manufacturing quality and costs of a variable displacement hydrostatic unit 100.

The separate hydrostatic servo assembly unit 1 can be fixed to a variable displacement hydrostatic unit 100 by means of bolts 85 or similar fixation means, for example, clamping means. A person skilled in the art may as well choose non-resolvable fixation techniques, such as gluing or welding. Also, other methods of fixing the hydrostatic servo unit 1 to the casing 106 of a variable displacement hydrostatic unit 100 are covered by the scope of the inventive concept.

Figure 8:
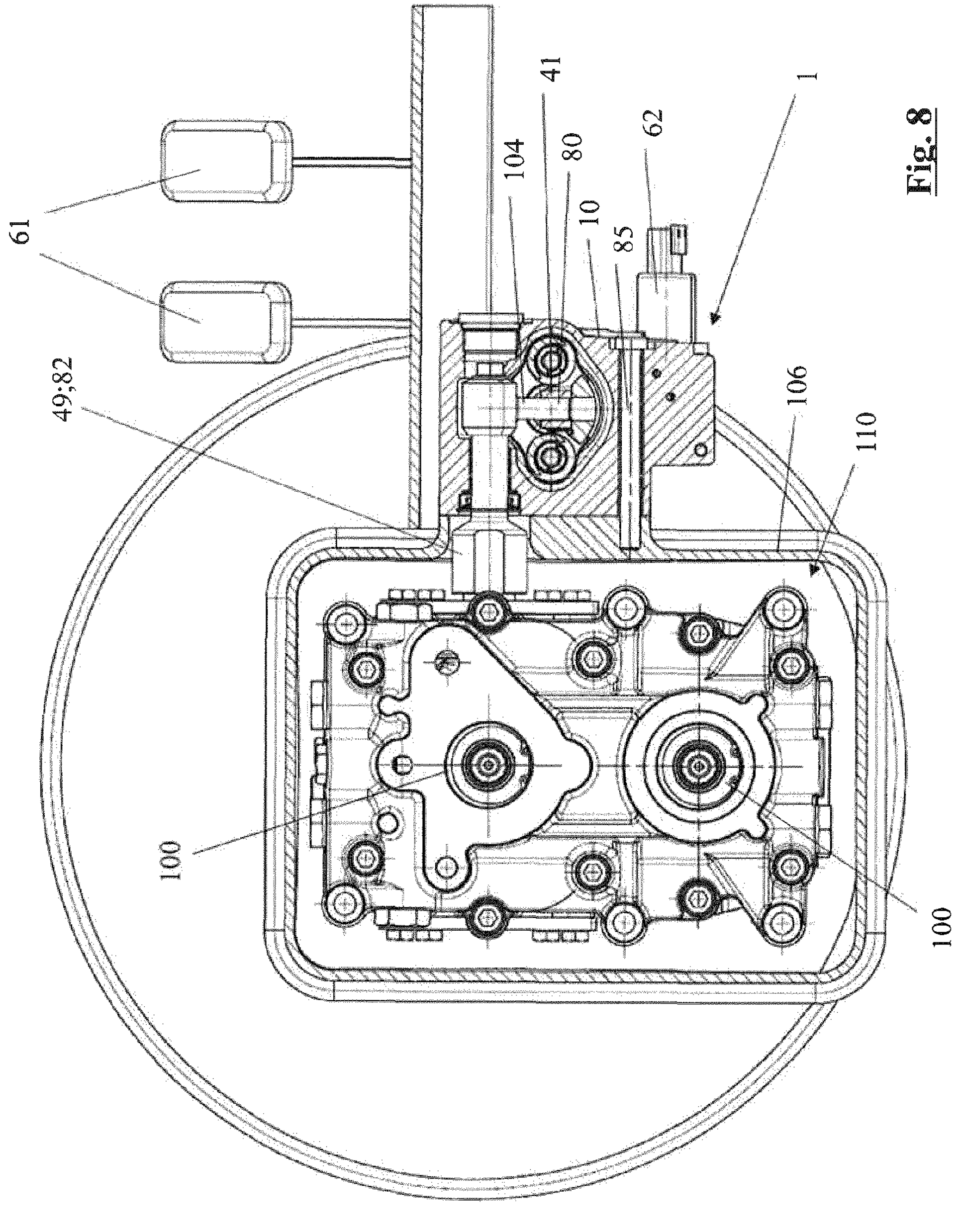
FIG. 8 a sectional view of a second embodiment of variable displacement hydrostatic unit with a laterally attached hydrostatic assembly unit according to the invention.

FIG. 8 shows a hydrostatic transmission 110 with one variable displacement hydrostatic unit 100 being, for example a hydrostatic pump, and another hydrostatic unit with constant displacement volume, for example a hydrostatic motor. It is clear to a person with relevant skills in the art that a hydrostatic transmission 110 can comprise different hydrostatic units, e.g., two variable displacement hydrostatic units 100. The hydrostatic transmission 110 is located inside of a transmission casing 106 which is sealed from the outside. A hydrostatic servo assembly unit 1 is provided as a separate assembly and is attached to the casing 106 of the hydrostatic transmission 110 by means of bolts 85. The housing 10 of the servo unit 1 is also closed to the outside. However, an opening is provided on one side of the housing 10. A movable output element 49 is protruding through the opening to the outside of the housing 10 of the servo unit 1 and to the inside the casing 106 of the hydrostatic transmission 110. The servo pressure acting on a servo piston 40 of the servo unit 1 can be controlled by means of actuators 62, e.g. electro-mechanical solenoids, or by moving pedals 61 which are mechanically or hydraulically coupled to the hydrostatic servo unit 1. In consequence, the pressure in one of the pressure chambers 25, 35 rises and the servo piston 1 is pushed sideways from its centered position.

As an eccentric mechanism 104 is provided inside of the housing 10 of the servo unit 1, the linear motion of the piston rod 41 is transmitted to the first end 80 of the eccentric mechanism 104. The second end 82 of the eccentric mechanism 104, in this case the movable output element 49, rotates in order to tilt a displacement element 102 (not shown), to which the output element 49 is operatively connected.

In summary with the hydrostatic servo assembly unit 1 according to the invention a robust and cost effective servo unit is provided, which ensures a good ability to adjust the center position of the servo unit to the neutral position of a hydraulic unit to be controlled by the inventive servo unit. The invention further provides for a more flexible design of hydraulic unit as the servo assembly unit 1 according to the invention is usable for a variety of apparatuses as a standardized servo unit. Hence, hydraulic units, in particular, can be designed smaller, as the servo assembly unit can be mounted remotely from the hydraulic unit.

While the present disclosure has been illustrated and described with respect to a particular embodiment thereof, it should be appreciated by those of ordinary skill in the art that various modifications to this disclosure may be made without departing from the spirit and scope of the present disclosure.

What is claimed is:

1. A hydrostatic servo assembly unit for being arranged inside or outside a casing of a variable displacement hydrostatic unit and for controlling a displacement of the variable displacement hydrostatic unit, the servo assembly unit comprising a servo housing in which at least one servo piston is arranged to move linearly relative to a servo cylinder formed in the servo housing, wherein the servo assembly unit comprises a movable output element protruding outside of the servo housing, which can be mechanically coupled to a displacement element of the variable displacement hydrostatic unit, wherein the at least one servo piston comprises two piston heads each sealing a cylindrically shaped pressure chamber arranged coaxially along a longitudinal bore axis and formed at either side of the servo housing, wherein each pressure chamber is formed by an end cap, such that outwardly facing front faces of the two piston heads are configured to be pressurized by servo pressure in the respective pressure chamber in order to move the at least one servo piston, wherein each pressure chamber is hydraulically connected to a pressure source such that the servo pressure can be alternately provided to the pressure chambers, wherein at least one servo spring is arranged between the two piston heads by means of two spring seats, the two spring seats including radial outer portions and radial inner portions with reference to the longitudinal bore axis, where the radial outer portions abut against the end caps and the radial inner portions are movable by the two piston heads in order to compress the at least one servo spring when one of the pressure chambers is pressurized with the servo pressure, wherein a servo piston rod of the at least one servo piston is connected operatively to a first end of an eccentric mechanism such that a second end of the eccentric mechanism rotates when the at least one servo piston is moving, and wherein a portion of the eccentric mechanism is located inside of the servo housing and the second end of the eccentric mechanism acts as the movable output element and protrudes outside the servo housing.

2. The hydrostatic servo assembly unit according to claim 1, wherein the output element is moveable linearly or rotatably.

3. The hydrostatic servo assembly unit according to claim 1, wherein the two piston heads comprise different diameters or the outwardly facing front faces of the two piston heads are equal with regard to the surface size on which servo pressure can act.

4. The hydrostatic servo assembly unit according to claim 1, wherein additional springs and/or dampers are arranged in at least one of the pressure chambers.

5. The hydrostatic servo assembly unit according to claim 1, configured to receive an adjustable servo pressure provided by the pressure source, the pressure source being selected from the group consisting of a hydraulic drive pedal, an electronic displacement control circuit, a hydraulic steering circuit and a charge pump.

6. The hydrostatic servo assembly unit according to claim 5, wherein the pressure source is connected to the pressure chambers via pilot valves, wherein each of the pilot valves is controlled by an actuator and/or are equipped with a pressure compensator.

7. A working machine comprising the hydrostatic servo assembly unit according to claim 6, wherein the pilot valves of the servo assembly unit are configured to be controlled according to command signals given to a control unit by an operator of the working machine.

8. The hydrostatic servo assembly unit according to claim 1, wherein a restoring force which is exerted by the servo spring and/or a center position of the at least one servo piston is/are adjustable by way of the endcaps being positionable relative to the servo housing.

9. The hydrostatic servo assembly unit according to claim 1, wherein at least one of the endcaps is formed integrally with the servo housing and/or a servo housing lid.

10. A variable displacement hydrostatic unit having the casing to which the hydrostatic servo assembly unit according to claim 1 is attached, wherein the second end of the eccentric mechanism is configured to directly or indirectly move the displacement element of the variable displacement hydrostatic unit in order to set the displacement volume of the variable displacement hydrostatic unit.

11. The variable displacement hydrostatic unit according to claim 10, wherein the servo assembly unit is arranged inside or outside of the casing of the variable displacement hydrostatic unit and the displacement element is arranged inside of the casing of the variable displacement hydrostatic unit.

12. The variable displacement hydrostatic unit according to claim 10, wherein the variable displacement hydrostatic unit is a hydrostatic pump or a hydrostatic motor of an axial piston or radial piston design.

13. A variable hydrostatic transmission with at least one variable displacement hydrostatic pump and one hydrostatic motor comprising the casing, which is a common transmission casing, to which the hydrostatic servo assembly unit according to claim 1 is attached, wherein the second end of the eccentric mechanism is configured to directly or indirectly move the displacement element of the at least one variable displacement hydrostatic pump in order to set a displacement volume of the at least one variable displacement hydrostatic pump.

14. A method of using a hydrostatic servo assembly unit to control a displacement of a hydrostatic unit, an open or closed circuit hydrostatic transmission, a steering device, a flap mechanism, or any other bi-directional moveable device/mechanism, the hydrostatic servo assembly unit comprising a servo housing in which at least one servo piston is arranged to move linearly relative to a servo cylinder formed in the servo housing, wherein the servo assembly unit comprises a movable output element protruding outside of the servo housing which can be mechanically coupled to a displacement element of a variable displacement hydrostatic unit, wherein the at least one servo piston comprises two piston heads each sealing a cylindrically shaped pressure chamber arranged coaxially along a longitudinal bore axis and formed at either side of the servo housing, wherein each pressure chamber is formed by an end cap, such that outwardly facing front faces of the two piston heads are configured to be pressurized by servo pressure in the respective pressure chamber in order to move the at least one servo piston, wherein each pressure chamber is hydraulically connected to a pressure source such that the servo pressure can be alternately provided to the pressure chambers, wherein at least one servo spring is arranged between the two piston heads by means of two spring seats, the two spring seats including radial outer portions and radial inner portions with reference to the longitudinal bore axis, where the radial outer portions abut against the end caps and the radial inner portions are movable by the two piston heads in order to compress the at least one servo spring when one of the pressure chambers is pressurized with the servo pressure, wherein a servo piston rod of the at least one servo piston is connected operatively to a first end of an eccentric mechanism such that a second end of the eccentric mechanism rotates when the at least one servo piston is moving, and wherein a portion of the eccentric mechanism is located inside of the servo housing and the second end of the eccentric mechanism acts as the movable output element and protrudes outside the servo housing.

* * * * *